United States Patent

Cook et al.

[11] 4,094,643
[45] June 13, 1978

[54] AMMONIUM NITRATE NEUTRALIZER

[75] Inventors: Toby M. Cook; Gerald L. Tucker; Marion L. Brown, all of Yazoo City, Mich.

[73] Assignee: Mississippi Chemical Corporation, Yazoo City, Mich.

[21] Appl. No.: 723,929

[22] Filed: Sep. 16, 1976

[51] Int. Cl.² ............................. C01C 1/18; B01F 5/10
[52] U.S. Cl. ...................................... 23/285; 423/396;
423/395; 23/283; 23/259.1; 261/76; 261/12 R; 366/167; 366/262
[58] Field of Search ....................... 23/285, 259.1, 283;
259/95; 261/121, 122

[56] References Cited
U.S. PATENT DOCUMENTS 3,758,277   9/1973   Cook et al. ........................... 23/285

Primary Examiner—James H. Tayman, Jr.
Attorney, Agent, or Firm—Oblon, Fisher, Spivak, McClelland & Maier

[57] ABSTRACT

A thermal syphon-pressure pump neutralizer for neutralizing nitric acid with ammonia, comprising a reaction vessel for containing an aqueous reaction medium and having a gas outlet in its upper end and a product outlet spaced therebelow, a fluid impervious vertically disposed cylindrical member in the vessel defining a second reaction zone therewithin and a first reaction zone between the member and the vessel, the lower inlet end of the cylindrical member being spaced above the bottom of the vessel, ammonia inlet means leading into the bottom of the vessel in close proximity to but spaced below the cylindrical member inlet, nitric acid inlet means leading into the first reaction zone being spaced a predetermined distance above the cylindrical member inlet and below the product outlet, a free gas zone being provided between the reaction zones and the gas outlet and deflector means above the second reaction zone and in communication with the first reaction zone so that solution and gases evolved from the outlet of the second reaction zone are substantially reintroduced into the first reaction zone before entering the free gas zone with sufficient force to create a scrubbing turbulence within the first reaction zone.

6 Claims, 4 Drawing Figures

PRIOR ART

AMMONIUM NITRATE NEUTRALIZER

BACKGROUND OF THE INVENTION

1. Field of the Invention

This invention relates to a commercially feasible process and apparatus for neutralizing nitric acid with ammonia whereby the "smog" formation usually associated with such neutralization is effectively avoided. More particularly, the present invention is concerned with an apparatus configuration which substantially reduces the amount of ammonia, nitric acid and/or ammonium nitrate evolved into the atmosphere during the production of ammonium nitrate from nitric acid and ammonia.

2. Description of the Prior Art

In Applicants' prior application Ser. No. 152,063 filed Jun. 11, 1971, now U.S. Pat. No. 3,758,277 and Ser. No. 260,392 filed May 18, 1972, now U.S. Pat. No. 3,870,782, Applicants disclosed an ammonium nitrate neutralizer which would significantly reduce the degree of "smog" formation which previously occurred during ammonia-nitric acid neutralization procedures. Those earlier studies resulted in development of apparatus and methods which succeeded in reducing ammonium nitrate emissions from what were previously considered to be good emission control levels, i.e. three to five pounds per ton of recovered product ammonium nitrate down to 0.78 pounds of ammonium nitrate and 0.77 pounds of ammonia per ton of product ammonium nitrate. These reductions in emission levels represented a substantial improvement over the emission levels previously being suffered by prior art processes.

Anticipated changes in Government standards with respect to ammonia emissions, however, are expected to require even better results for control of ammonia emissions. Applicants at first considered that their previous apparatus could meet such increased standards. It was considered that, by varying the acidity within the first and second reaction zones, the degree of ammonia emissions could be reduced. However, when the acid content was varied, it was found that either the rate of ammonia emission was not reduced, or it was found that the rate of nitric acid or ammonium nitrate emission rose significantly.

In the prior apparatus, a deflector was situated above the outlet of the second reaction zone, which was situated within the core of the apparatus. The core of the apparatus defined a first reaction zone, which was situated outside the core of the reactor, and thus outside the said second reaction zone. The vapors and liquids fountaining from the second reaction zone hit the deflector and the liquids were deflected downwardly into the second reaction zone. The vapors would pass around the deflector and would pass upwardly toward the gas outlet. In arriving at the present invention, it was first considered to situate the deflector such that both the liquids and the vapors fountaining from the second reaction zone were deflected entirely into the first reaction zone. It was theorized that any ammonia gases emitting from the second reaction zone would be brought into contact with the acid conditions in the first reaction zone and hence the scrubbing action in the first reaction zone would scrub out any ammonia. It was found, however, that when this was tried, the level of ammonia nitrate and nitric acid emissions rose drastically to levels comparable to previous prior art equipment.

A need, therefore, continued to exist for a method and apparatus of further reducing the levels of particulate ammonium nitrate, ammonia and/or nitric acid evolved during the production of ammonium nitrate.

SUMMARY OF THE INVENTION

Accordingly, it is one object of this invention to provide an economically feasible nitric acid ammonia neutralization method which minimizes the extent of smog formation and ammonia emissions to acceptably lower levels.

Another object of this invention is to provide a thermal siphon pressure pump neutralizer for accomplishing said method, which is simple in design, and which does not require auxiliary scrubbing equipment to reduce the smog formation and ammonia emissions to acceptably low levels.

Briefly, these and other objects of the the present invention, as hereinafter will become more readily apparent, can be attained by a thermal syphon-pressure pump neutralizer being adapted for neutralizing nitric acid with ammonia, comprising a reaction vessel suitable for containing an aqueous reaction medium and having a gas outlet in its upper end and a product outlet spaced below said gas outlet, at least one elongated fluid impervious cylindrical member positioned substantially vertically within said vessel so as to define a second reaction zone within said member and a first reaction zone outside said member between said member and said vessel, the lower end of said cylindrical member being an inlet being situated in said vessel such that said inlet of said cylindrical member is spaced above the bottom of the vessel, ammonia inlet means leading into the bottom of said reaction vessel being in close proximity to but spaced below said inlet of said cylindrical member, nitric acid inlet means leading into said first reaction zone being spaced a predetermined distance above said inlet of said cylindrical member and below the level of said product outlet of said vessel, said apparatus being operable for neutralizing nitric acid with ammonia by filling said vessel wih an aqueous medium at least to the level of said product outlet and introducing nitric acid into said first reaction zone through said nitric acid inlet means and ammonia into the reaction vessel through said ammonia inlet means, and diluting the concentration of the nitric acid before entering said second reaction zone so that the major portion of nitric acid being introduced through said nitric acid inlet means will be neutralized with the ammonia being introduced through said ammonia inlet means in said dilute concentration within said second reaction zone, and whereby circulation mixing and turbulence of the aqueous medium, nitric acid and ammonia between said first reaction zone and said second reaction zone is facilitated by a thermal syphon and pressure effect caused by the heat of neutralization and the density differential between the product solution and the reacted solution such that water vaporized by said heat of neutralization will be discharged through said outlet of said second reaction vessel and ammonium nitrate product will be recovered through said product outlet of said reaction vessel, wherein the improvement comprises said reaction vessel further containing a free gas zone between said reaction zones and said gas outlet being situated such that gases disengaging from said first reaction zone will enter said free gas zone, and then into said gas outlet, deflector means situated above said second reaction zone and in communication with said first reaction zone such that solution and gases evolved from the outlet of said second reaction zone are substantially completely reintroduced into said first reaction zone before entering said free gas zone above said first reaction zone with sufficient force so as to create a scrubbing turbulence within said first reaction zone, whereby turbulent contact between said liquid within said first reaction zone and said gases will scrub the gases and cause dissolution of soluble components of said gases into said liquid, such that gases emanating from said first reaction zone into said free gas zone are substantially completely scrubbed of soluble components.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
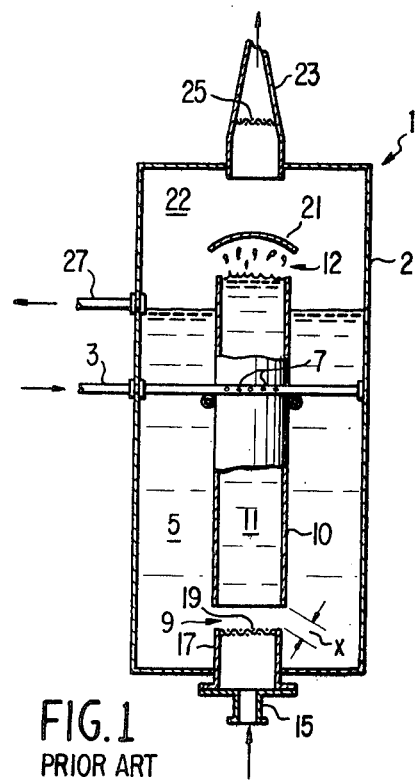
FIG. 1 shows applicants' previous nitric acid-ammonia neutralizer.

Reference will first be made to FIG. 1, which shows one embodiment of applicants' prior ammonium nitrate reactor disclosed in the above-mentioned U.S. Patents, to enable complete understanding of the improvement of the present invention. In the apparatus 1, a nitric acid solution enters vessel 2 through entry port 3 containing spargers 7 in such a manner that it flows into and downward through that volume of reaction solution defined as the first reaction zone 5. A second reaction zone 11 is defined by the elongated, fluid impervious, central, cylindrical member 10 positioned concentrically within vessel 2. Member 10 is provided with an inlet 9 and an outlet 12. A deflector means 21 is positioned in the free gas zone above the outlet 12 of the second reaction zone 11. Member 10 is positioned within the reactor vessel 2 such that when the vessel contains an aqueous reaction medium, inlet 9 of member 10 will be below the level of the aqueous medium of the first reaction zone, and outlet 12 will be above the level of the aqueous medium. The variable distance "X" between central member 10 and ammonia inlet 17, at whose base is attached ammonia sparger 15, controls the size of inlet 9 and consequently regulates the velocity of the aqueous reaction medium withdrawn from the first reaction zone 5 through inlet 9 up into the upward flowing solution of the second reaction zone within the central member. Ammonia inlet 17 can also be provided with a screen 19. The device is also provided with gas exit port 23 above free gas zone 22, containing screening or filtering means 25, and reaction solution exit port 27.

In the previous neutralization process, concentrated nitric acid solution is passed into the first reaction zone 5 where the nitric acid is diluted. The aqueous solution from the first reaction zone 5 containing nitric acid is withdrawn by the force of the fluid currents in motion in first reaction zone 5 into the second reaction zone through the entry port 9 at the base of the central member. The nitric acid containing solution contacts the upward flowing ammonia gas in the second reaction zone 11 where the majority of the reaction occurs between nitric acid and ammonia. The reaction is exothermic and causes the solution to boil. The force of the rising ammonia gas and the heat evolved by the reaction combine to cause the liquid, by a thermal syphon pressure pumping effect, to fountain above the second reaction zone 11 and be deflected by deflector 21 such that the liquids are brought back into the first reaction zone 5 while the gases are permitted to move around the deflector 21 and into the gas exit port 23.

Although that prior device did succeed in markedly reducing the degree of ammonia and ammonium nitrate emissions into the atmosphere far below any other prior art device, it seemed desirable to reduce still further the level of ammonia emissions. On the belief that the degree of ammonia emissions was a result of the particular acid level in the reactor, experiments were conducted to study the effect of the acid level on ammonia emission. Raising the acidity of the reaction medium reduced the level of ammonia emission, however, in practice, the result was substantial increases in nitric acid and ammonium nitrate emissions.

A study of the liquid and gas flow patterns in a plexiglass model of the device described in U.S. Pat. Nos. 3,758,277 and 3,870,782 has now shown that the recirculation of liquid through the second reaction zone 11 was very high and that the upward flowing gas-liquid mixture is diverted at the top of the second reaction zone 11 back into the first reaction zone 5. Since the liquid level in the first reaction zone 5 is below the deflector 21, the gas disengages from the liquid, but when the liquid jet strikes the surface of the first reaction zone 5, gas is entrained, producing large amounts of bubbles.

The possibility of scrubbing the gases of their ammonia content was also considered and it was attempted to bring the gases and liquids fountaining from the second reaction zone 11 entirely into the first reaction zone 5. This initially resulted in emission losses that were even greater than attained in the older prior art devices. Further studies to determine why the losses had been so high led to the understanding that the entrained bubbles that entered the first reaction zone 5 were being carried downwardly by the thermal pumping action and into the second reaction zone 11. Since the bubbles are composed largely of superheated steam, nitric acid is steam stripped from the solution and may react with ammonia to form ammonium nitrate microparticulate in the exhaust stack. Moreover, the bubbles of superheated steam in the second reaction zone 11 impair the mass transfer of ammonia into the liquid phase. The understanding that the difficulty of emission losses seemed to be a result of gas entrainment in the first reaction zone 5 seemed to mitigate against the concept of introducing substantially all of the gases and liquids fountaining from the second reaction zone 11 into the first reaction zone 5. The evidence tended to support a theory of improving the gas disengagement of the gases from the fountaining liquids.

Nevertheless, it has now been found that if the product fountaining from the second reaction zone 11 is substantially completely diverted into the first reaction zone 5, then the degree of ammonia, nitric acid and ammonium nitrate losses can be decreased to a surprisingly low extent, if certain other factors are carefully controlled. In particular, it has now been found that if substantially all of the gases and liquids fountaining from the second reaction zone 11 are deflected into the first reaction zone 5 with sufficient force to create severe turbulence therein, the turbulence will serve to intimately contact the gases with the acidic liquid medium thereby scrubbing soluble components from the gases. The ammonia present in the gases will be contacted with the acid to form ammonium nitrate which will be dissolved in the bath.

A critical element to success is the provision that the downward velocity of the liquid medium in the first reaction zone 5 must be adjusted so that down flow of gas bubbles to the inlet 9 of the second reaction zone 11 is prevented.

It is the discovery of the present invention that the presence of ammonia, nitric acid and ammonium nitrate contaminants in the expelled waste gases from ammonium nitrate reactor can be substantially reduced if the reactor is designed, or the recirculating liquid flow rates are adjusted, such that the gas which is to be expelled into the free gas zone 22 above the liquid reaction zones is deflected back into the first reaction zone 5 to allow further turbulent scrubbing of the gas bubbles by the liquid medium in said zone before exiting the reactor via the free gas zone 22. It is essential that the rate at which the medium in the first reaction zone 5 flows downward toward the entry port 9 of the second reaction zone 11 be less than the terminal rise velocity of the gas bubbles which are deflected into the first reaction zone 5. The terminal velocity of a gas bubble is that velocity attained by a rising gas bubble in the liquid medium, starting from a rest position. In other words the downward flow of liquid in the first reaction zone 5 must not be of sufficient force to counteract the natural tendency of the deflected gas bubbles to rise to the upper regions of the first reaction zone 5. The down flow velocity of the liquid must not carry the substantial portion of the gas bubbles down through the first reaction zone 5 to the entry port 9 of the second reaction zone 11. Thus, by allowing the deflected gas bubbles to be turbulently scrubbed in the first reaction zone 5, any ammonia and/or nitric acid within the gas bubbles can be further scrubbed from the bubbles, and possibly some ammonium nitrate particles within the bubbles. As a result of the further turbulent scrubbing of the deflected gas bubbles in the first reaction zone 5, the gas which rises from the first zone 5 into the free gas zone 22 and which is expelled from the reactor contains very little ammonia, nitric acid or particulate ammonium nitrate and is thereby free of the objectionable smog common to gas effluents from ammonium nitrate manufacturing processes.

As determined from various experiments in which air bubbles were expelled into a liquid solution and allowed to rise, the terminal rise velocity is typically in the order of 0.55 ft./sec.. This is a best estimated average value from several experiments and does not represent a fixed, non-varying value since the terminal rise velocity is a function of several factors such as the components and size of the gas bubble and the viscosity and density of the liquid medium. However, the terminal rise velocity of the gas bubbles in any given system can be easily determined by conventional methods.

Any means by which the velocity of the downward flowing liquid medium in the first reaction zone 5 is controlled to a value of less than the terminal velocity of the rising gas bubbles deflected into the first reaction zone 5 can be employed in the present invention. For instance, referring to FIG. 2, the velocity $V_1$ in the first reaction zone 5 can be controlled to a value less than the terminal rise velocity of the deflected gas bubbles by controlling the rate at which liquid recirculates from the first zone 5 into the second zone 11. The circulation of liquid between the first and second reaction zones is facilitated by a thermal pumping and pressure effect caused by the exothermic heat of neutralization and by the density differential between the product solution and the reacted solution. The apparatus of FIG. 2 further differs from the conventional apparatus in that deflector 21 is positioned above the second reaction zone 11 such that liquid and gases fountained from said second zone are substantially completely deflected back into the first reaction zone 5 without allowing the gas to first pass into free gas zone 22. In this case, the outlet of the central cylindrical member 10 can be at or even above the level of liquid in the reactor.

Another satisfactory means for controlling the liquid velocity in such a reactor can be accomplished by substantially enlarging the volume of the first reaction zone 5 relative to the second reaction zone 11, thereby decreasing the downward liquid velocity in the first reaction zone 5. This velocity can be decreased in the first reaction zone 5, if desired, to a rate which approaches zero. However, decreasing the velocity to that extent introduces disadvantages in that it makes control of the pH of the first reaction zone more difficult. Moreover, the low velocity requires the use of the relatively massive pieces of equipment to achieve the production levels which are normally obtained at higher velocities.

Figure 3:
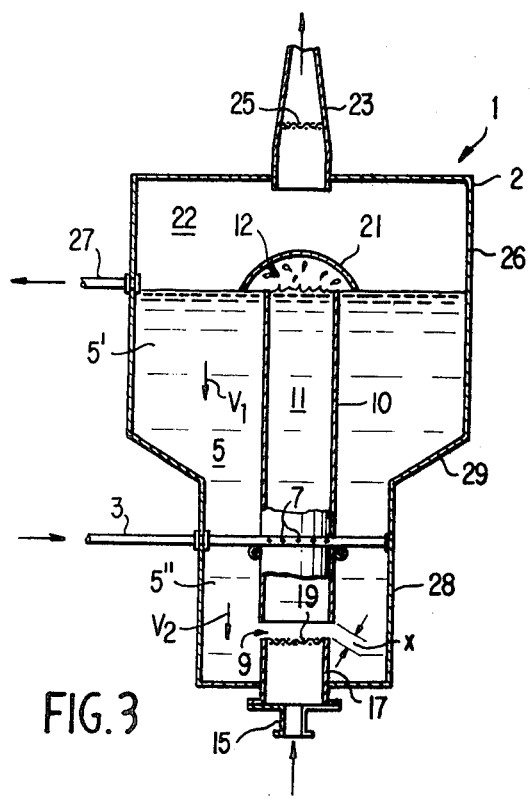
FIG. 3 shows another embodiment of the nitric acid-ammonia neutralizer of the present invention.

Another approach to achieve turbulent scrubbing of deflected gas bubbles in the first reaction zone 5 without carrying the bubbles down to the entry port 9 of the second zone 11 can be achieved by different modifications of the reactor, all of which, in effect, accelerate the downward flow of recirculating liquid medium in the lower section 5" of the first zone 5 relative to the downward rate of flow of the liquid in the upper section 5' of the first zone 5. Of course, in all modifications, the downward flow rate of the liquid in the upper section 5' of the first reaction zone 5 must be less than the terminal rise velocity of the rising gas bubbles in the liquid medium. One embodiment of accelerating liquid medium flow in the lower section of the first reaction zone 5 is shown in FIG. 3 wherein the outer wall of vessel 2 is provided with an outwardly expanded portion 26 in the upper section 5' of the first reaction zone 5 of greater cross-sectional area than the area of the narrower portion 28 in the lower section 5" of the reactor. Consequently, the downward flow velocity $V_1$ of reaction solution in the first reaction zone 5 in the upper section 5' is less than the terminal rise velocity of gas bubbles in the section which prevents bubbles from being transported down into region 5" of the first reaction zone 5 and allows sufficient time for gas/liquid disengagement.

The liquid in the first reaction zone 5 continues downward into section 5" of the device, where its flow velocity is increased, and it contacts the concentrated nitric acid entering the device through spargers 7 in inlet line 3. The distance between inlet line 3 and entry port 9 is not critical. The only requirement is that good mixing of the entering nitric acid in the reaction medium occur before the acid solution flows into the second reaction zone 11. The flowing liquid then enters the second reaction zone 11, which is confined by a fluid impervious central member 10, through inlet 9. The size of inlet 9 is not critical and should be of sufficient size to permit an unimpeded flow of liquid into the second reaction zone 11. The liquid entering the second reaction zone 11 is vigorously mixed with the upwardly flowing ammonia gas which enters the second reaction zone through ammonia spargers 15 of inlet 17. Most of the reaction between nitric acid and ammonia occurs in the second reaction zone 11. The heat of neutralization released by the exothermic neutralization process, with the associated steam produced, promotes the circulation of liquid between the first reaction zone 5 and the second reaction zone 11. The force of the injected ammonia gas also aids in the promoting the circulation of the liquid through the zones. Reaction solution fountains out of the central member through outlet 12 where it is recirculated to the upper section 5' of the first reaction zone 5. The gas which is evolved from the second reaction zone 11 is deflected back into the upper section 5' of the first reaction zone 5 by deflector 21 where turbulent scrubbing of the deflected gas bubbles occurs. The gas bubbles which disengage and rise upwardly and out of the first reaction zone 5 pass into free gas zone 22 and exit the reactor through outlet 23. Reaction solution containing product ammonium nitrate can be withdrawn through outlet 27.

The level of the liquid in the first reaction zone 5 should be of sufficient depth to prevent gas bubbles from being carried down into the lower region 5" of the first reaction zone 5. The deflector device 21 should be at, or below, the liquid level in the reactor to deflect the gas or vapor fountaining from the second zone 11 without allowing the evolved gas to pass directly into the free gas zone 22, thereby effecting the turbulent scrubbing of the gas bubbles in the liquid medium of the first reaction zone 5. The deflector can be of any shape or size so long as it serves the desired purpose of deflecting the evolved gases back into the first reaction zone 5.

Another deflector means for achieving the desired turbulent reintroduction of the gases and liquids into the first reaction zone 5 is accomplished by simply raising the liquid level in the reactor to a height above the opening 12 of the second reaction zone 11 a sufficient degree so that the liquid level aids to deflect the liquids and gases fountaining from the second reaction zone, back in the first reaction zone.

Referring to FIG. 3, the distance between the liquid level in the reactor and the base of the upper section 5' in the first reaction zone 5 need only be of sufficient depth to allow vapor/bubble disengagement without permitting bubbles to be carried down into the lower region 5" of the first reaction zone 5 having an accelerated velocity $V_2$ relative to $V_1$. Thus, $V_1$ in section 5' must be less than the vertical rise velocity of the gas bubbles in the upper section 5' of the first reaction zone 5. The accelerated velocity $V_2$ in lower section 5" is achieved by decreasing the cross-sectional area of the lower section 5" relative to the cross-sectional area of the upper section 5'. By decreasing the cross-sectional area of the lower section 5", and thus decreasing the volume of the reactor in this section, the size of the reactor in this section can be decreased while maintaining good production levels of product ammonium nitrate. Decreasing the cross-sectional area of lower section 5" obviates the necessity of using larger apparatus to achieve the same production levels of ammonium nitrate. The cross-sectional area of the upper section 5' of the reactor is greater than the cross-sectional area of the lower section 5" and can be of any convenient area such that the velocity $V_1$ of downward flowing liquid in section 5' is maintained less than the terminal rise velocity of gas bubbles in section 5' to allow disengagement of the rising gas bubbles from zone 5.

Although the outer wall of the reactor of FIG. 3 is shown as tapering inward over section 29 at the transitional section between the upper 5' and lower 5" sections of the first reaction zone 5, this area does not have to be tapered. The reactor can be structured such that there is an abrupt change in the diameter of the outer wall between the two regions of the first reaction zone without any gradual sloping of the reactor wall. However, such a configuration would have the structural disadvantage of being weaker than a reactor whose outer wall is sloped or inclined over a distance, Moreover, in a reactor wherein the incline of the outer wall is flattened to a horizontal surface, a relatively quiet, non-turbulent and non-mixing region can form at the base of the upper section 5' of the first reaction zone 5 which can not exist in a reactor whose outer wall is inclined over the transitional region. More preferably, transitional section 29 of the reactor is provided with a slope of 30° to 90°, especially 45° to 60°.

Figure 2:
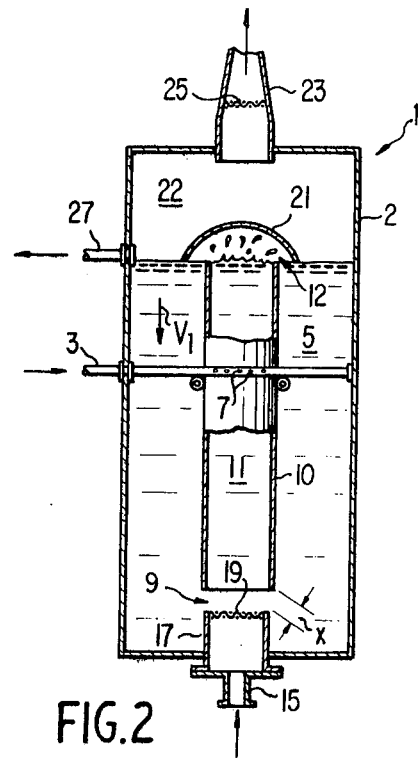
FIG. 2 shows an embodiment of the nitric acid-ammonia neutralizer of the present invention.
Figure 4:
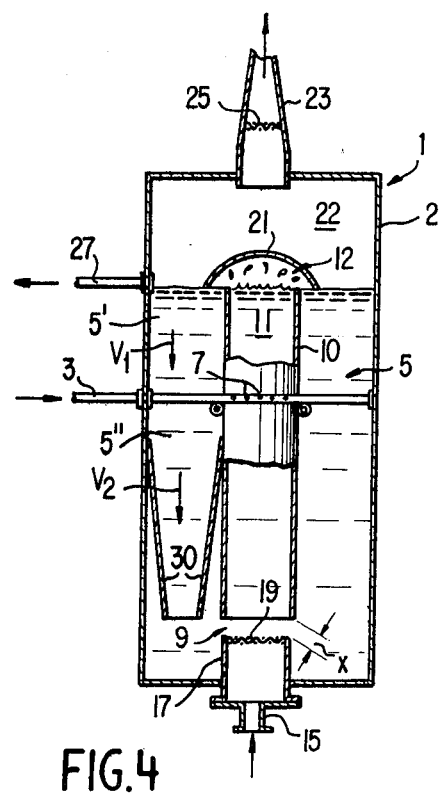
FIG. 4 shows still another embodiment of the nitric acid-ammonia neutralizer of the present invention.

Another embodiment of the apparatus of the invention is shown in FIG. 4, which is essentially the reactor of FIG. 2, except that instead of tapering the outer wall to a smaller lower section 5" of the first reaction zone 5, the outer wall is maintained continuously vertical and either one or both of the walls which define the lower section 5" of the first reaction zone 5 are provided with a member(s) 30 which channels the flow of liquid in section 5" thereby providing an accelerated liquid flow of velocity $V_2$. Suitable flow rates $V_2$ of the reaction medium in this and other apparatus embodiments range from 1 to 2.5 ft./sec., preferably 1.5 ft./sec.

In the operation of the apparatus of the present invention, aqueous nitric acid is sparged into the first reaction zone 5 at a point below the upper section 5' of the zone to provide rapid and thorough mixing and dilution of the acid in the liquid medium. The concentration of acid used can range from highly dilute to very concentrated. For best efficiency, the acid concentration ranges from 55% to 68% which is the range of commercial acid preparations. Concentrations in this range permit the production of ammonium nitrate solutions in concentrations ranging from 77% to 84%. Lower or higher concentrations may, however, be used. The nitric acid entry line must be positioned a sufficient distance from the entry port 9 to the second reaction zone 11 in order to achieve sufficient mixing and dilution of the nitric acid to at least a concentration below 0.30% in the lower section 5" of the first reaction zone 5 as it enters the second reaction zone 11. Preferably, the acid is diluted from 0.05% to 0.30%.

In operation of the device of the invention, an ammonia containing gas is introduced into the reactor through entry port 17, and it is allowed to rise through the second reaction zone 11 where the ammonia reacts with the nitric acid in solution to form ammonium nitrate. Any suitable ammonia containing gas can be used, such as ammonia itself, or ammonia containing gases such as a very common source known as urea off gas which consists of ammonia, carbon dioxide and steam. The maximum rate of flow of ammonia into the reactor is a function of the diameter of the central member defining the second reaction zone.

Because the reaction between ammonia and nitric acid is exothermic, the gas and liquid medium issuing from the second reaction zone 11 are hot. The gas is deflected by deflection means 21, as hot bubbles, into the first reaction zone 5. The previously violent and turbulent conditions provide for very efficient scrubbing of the gas bubbles containing soluble components in the liquid. The soluble components which can exist in the gas bubbles include nitric acid, ammonia and ammonium nitrate. However, it is very important to control the mixing because, without control, such undesirable situations as achieving decreased ammonia emissions in the exhaust gas with concomitant increased ammonium nitrate emissions can occur. In the turbulent conditions which prevail in the upper section 5' of the first reaction zone, the hot gas bubbles consisting substantially of steam and $CO_2$ would be expected to strip free nitric acid from the solution which would react with free ammonia in the bubbles to form ammonium nitrate, which, in turn, would be evolved as a particulate material from the reactor. Careful control of this situation can be achieved by controlling the free acid content in the upper section 5' of the first reaction zone 5 to a value as low as possible. It is important to provide a low level of acid concentration which provides a driving force for removing ammonia in the gas bubbles by reaction to form ammonium nitrate. Normally, the gas bubbles are too hot to allow dissolution of ammonia in the gas bubbles into the liquid reaction medium. Therefore, the necessary driving force for escape of ammonia from the gas bubbles is provided by the presence of low concentrations of nitric acid in the reaction solution. If there is no such driving force, ammonia will be lost to the atmosphere. If too much acid is present, the nitric acid will be vaporized from solution because of the stripping action of the superheated steam. Usually, the nitric acid concentrations in the uppermost portion of section 5' of the first reaction zone 5 ranges from 0.02% – 0.05%, preferably 0.035% – 0.05%, with an optimum value of 0.035%, although it could be as high as 0.15%.

The optimum concentration point provides an adequate amount of nitric acid in the upper section 5' of the first zone 5 while providing good control of the pH solution. At concentration levels somewhat less than that of the optimum value, control of the pH of the solution is much more difficult because of the close proximity to the inflection point of the acid-base neutralization curve where wide variations in pH occur at slight changes in acid or base concentrations. It is possible to conduct the process by maintaining the pH of the solution in the upper section 5' of the first zone 5 on the basic side. While excellent nitric acid and ammonium nitrate recoveries are achieved, this is accomplished with major $NH_3$ losses. Thus, an ammonia concentration level as high as 0.02% could be maintained to attain these results. There are instances where large ammonia losses can be tolerated to achieve very small nitric acid or ammonium nitrate losses. In order to achieve overall good $NH_3$, nitric acid and ammonium nitrate recovery, the above concentration ranges for nitric acid concentrations should be maintained.

The free nitric acid concentration in the lower section 5" of the first reaction zone 5 at the entry port 9 to the second reaction zone 11 must also be controlled if good ammonia, nitric acid and ammonium nitrate recoveries are to be achieved. Usually, the acid concentration ranges from 0.05% to 0.30%, preferably 0.18% to 0.23%, most preferably from 0.2% to 0.23%.

The design modification of the present invention has resulted in a substantial reduction in total emissions over the emissions obtained from the prior art apparatus. Typically, ammonium nitrate emissions of 0.5 pounds per ton of product, and ammonia emissions of about 0.1 pound per ton of product can be achieved with the present apparatus. This represents approximately a 36% reduction in ammonium nitrate emissions and an 85% reduction in ammonia emissions over the best prior apparatus.

Having generally described this invention, a further understanding can be obtained by reference to certain specific examples which are provided herein for purposes of illustration only and are not intended to be limiting unless otherwise specified.

The data in Table 1 below were obtained from the conventional ammonium nitrate reactor of U.S. Pat. No. 3,758,277 which has an outer shell of constant diameter. The data in Table 2 below were obtained from the reactor of the present invention, as embodied in FIG. 3, which has an expanded outer shell disposed above a more narrow, lower outer shell. The narrow, lower outer shell of the reactor of the present invention had the same diameter as the constant diameter outer shell apparatus of the conventional reactor. The reactor capacities in both cases were the same at 175 tons per day of ammonium nitrate. The ammonia containing gas admitted into each reactor was a urea-off gas having the same composition of 45-60 wt.% $NH_3$, 15-25 wt.% $CO_2$ and 20-30 wt.% $H_2O$. The nitric acid solution admitted into both reactors was of the same concentration which ranged from 57-58% by weight $HNO_3$. The flow rate (Gallons per minute) of nitric acid solution into the reactors is dependent upon the production rate of ammonium nitrate desired and can be determined from the formula:

GPM Acid Flow = (Production Rate (TPD)/5.85)

The reaction temperature in both reactors ranged from 250°–270° F which is relevant because at atmospheric pressure, this temperature is the boiling point of the ammonium nitrate being produced. These temperatures are indicative of the solution concentration.

In the reactor of the present invention, the downward liquid velocity $V_1$ in the upper section of the reactor was 0.45-0.5 feet per second, while the downward liquid velocity $V_2$ in the lower section of the reactor was 1.5 feet per second.

Table 1

| Conventional Ammonium Nitrate Reactor | | | |
|---|---|---|---|
| Production Rate, Tons/Day (100%AN) | Prod. Free Acid, % | Emission, #ton Product | |
| | | $NH_3$ | $NH_4NO_3$ |
| 176 | 0.098 | 0.77 | 0.86 |
| 165 | 0.096 | 0.46 | 0.82 |
| 182 | 0.098 | 0.11 | 0.95 |
| 182 | 0.070 | 1.10 | 0.50 |
| 182 | 0.093 | 1.40 | 0.80 |
| Average | | 0.77 | 0.78 |

Table 2

| Production Rate Tons/day 100% $NH_4NO_3$ | Product Free Acid,% | Emissions, Ton Product | | React. Temp. ° F |
|---|---|---|---|---|
| | | $NH_3$ | $NH_4NO_3$ #ton | |
| 119 | 0.032 | 0.1 | 0.6 | 259 |
| 211 | 0.036 | nil | 0.5 | 259 |
| 199 | 0.033 | 0.2 | 0.7 | 259 |
| 205 | 0.031 | 0.1 | 0.6 | 257 |
| 146 | 0.030 | 0.1 | 0.6 | 259 |
| 205 | 0.049 | 0.1 | 0.6 | 253 |
| 205 | 0.035 | 0.1 | 0.6 | 253 |

Table 2-continued

| Production Rate Tons/day 100% NH$_4$NO$_3$ | Product Free Acid,% | Emissions, Ton Product NH$_3$ | NH$_4$NO$_3$ #ton | React. Temp. °F |
|---|---|---|---|---|
| Average: | | 0.1 | 0.6 | |

Having now fully described this invention, it will be apparent to one of ordinary skill in the art that many changes and modifications can be made thereto without departing from the spirit and scope of the invention as set forth herein.

What is claimed as new and desired to be secured by Letters Patent of the United States is:

1. A thermal syphon-pressure pump neutralizer being adapted for neutralizing nitric acid with ammonia, comprises a reaction vessel suitable for containing an aqueous reaction medium and having a gas outlet in its upper end and a product outlet spaced below said gas outlet, at least one elongated fluid impervious cylindrical member positioned substantially vertically within said vessel so as to define a second reaction zone within said member and a first reaction zone outside said member between said member and said vessel, the lower end of said cylindrical member being an inlet being situated in said vessel such that said inlet of said cylindrical member is spaced above the bottom of the vessel, ammonia inlet means leading into the bottom of said reaction vessel being in close proximity to but spaced below said inlet of said cylindrical member, nitric acid inlet means leading into said first reaction zone being spaced a predetermined distance above said inlet of said cylindrical member and below the level of said product outlet of said vessel, said apparatus being operable for neutralizing nitric acid with ammonia by filling said vessel with an aqueous medium at least to the level of said product outlet and introducing nitric acid into said first reaction zone through said nitric acid inlet means and ammonia into the reaction vessel through said ammonia inlet means, and diluting the concentration of the nitric acid before entering said second reaction zone, so that the major portion of nitric acid being introduced through said nitric acid inlet means will be neutralized with the ammonia being introduced through said ammonia inlet means in said dilute concentration within said second reaction zone, and whereby circulation mixing and turbulence of the aqueous medium, nitric acid and ammonia between said first reaction zone and said second reaction zone is facilitated by a thermal syphon and pressure effect caused by the heat of neutralization and the density differential between the product solution and the reacted solution such that water vaporized by said heat of neutralization will be discharged through said gas outlet of said reaction vessel and ammonium nitrate product will be recovered through said product outlet of said reaction vessel, wherein the improvement comprises: said reaction vessel further containing a free gas zone between said reaction zones and said gas outlet being situated such that gases disengaging from said first reaction zone will enter said free gas zone, and then into said gas outlet, deflector means situated above said second reaction zone and depending thereabout to at least the level of said product outlet such that solution and gases evolved from the outlet of said second reaction zone are substantially completely reintroduced into the liquid in said first reaction zone before entering said free gas zone above said first reaction zone with sufficient force so as to create a scrubbing turbulence within said first reaction zone, whereby turbulent contact between said liquid within said first reaction zone and said gases will scrub the gases and cause dissolution of soluble components of said gases into said liquid, such that gases emanating from said first reaction zone into said free gas zone are substantially completely scrubbed of soluble components.

2. The thermal syphon-pressure pump neutralizer of claim 1, wherein said deflector means is a curvilinear deflector which is supported above the cylindrical member outlet such that solution and gas evolved from said member are substantially completely deflected downwardly into said first reaction zone with force sufficient to create scrubbing turbulence of said gas.

3. The thermal syphon-pressure pump neutralizer of claim 1, wherein said deflector means is a region of reaction fluid above the outlet of the second reaction zone and liquid levels of said first and second reaction zones such that solution and vapors fountained from the outlet of said second reaction zone are substantially completely deflected and brought into contact with the liquid in said first reaction zone.

4. The thermal syphon-pressure pump neutralizer of claim 1, wherein said reaction vessel has upper and lower sections defining said first reaction zone, which are constructed so that the cross-sectional area of said upper section is greater than the cross-sectional area of said lower section thereby modifying the downward flow of solution in the first reaction zone such that the velocity of the downwardly flowing solution in the upper section is less than the terminal velocity of gas bubble rise such that substantially all the undissolved vapors introduced into said first reaction zone by the deflection of gases by said deflector means will be permitted to rise to the surface of the first reaction zone to enter said free gas zone, and wherein the vertical axial length of said upper section is sufficient such that said gas bubbles are substantially maintained within said upper section and wherein the velocity of the downward flowing solution in the lower section is greater than the terminal velocity of said rising gas bubbles.

5. The thermal syphon-pressure pump neutralizer of claim 4, wherein said reaction vessel is cylindrical in configuration and wherein said upper section has a greater diameter than said lower section and wherein said upper and lower sections are separated by a converging conical section.

6. The thermal syphon-pressure pump neutralizer of claim 4, wherein said reaction vessel is cylindrical in configuration and of substantial uniform diameter throughout its length, said vessel containing channeling means in the lower region thereof such that the cross-sectional area of said upper section is greater than the effective cross-sectional area of said lower section.

* * * * *

UNITED STATES PATENT AND TRADEMARK OFFICE
CERTIFICATE OF CORRECTION

PATENT NO. : 4,094,643
DATED : June 13, 1978
INVENTOR(S) : Toby M. Cook et al

It is certified that error appears in the above-identified patent and that said Letters Patent are hereby corrected as shown below:

Please correct the <u>State</u> of the Inventors and Assignee to read as follows: --Mississippi--

Signed and Sealed this

Fifteenth Day of January 1980

[SEAL]

Attest:

SIDNEY A. DIAMOND

Attesting Officer

Commissioner of Patents and Trademarks